(12) United States Patent
Xie

(10) Patent No.: US 12,450,913 B2
(45) Date of Patent: Oct. 21, 2025

(54) VEHICLE-MOUNTED COLLECTION DEVICE

(71) Applicant: SHENZHEN YINWANG INTELLIGENT TECHNOLOGIES CO., LTD., Shenzhen (CN)

(72) Inventor: Kefeng Xie, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 199 days.

(21) Appl. No.: 18/473,486

(22) Filed: Sep. 25, 2023

(65) Prior Publication Data

US 2024/0013549 A1 Jan. 11, 2024

Related U.S. Application Data

(63) Continuation of application No. PCT/CN2022/079914, filed on Mar. 9, 2022.

(30) Foreign Application Priority Data

Mar. 29, 2021 (CN) .............................. 202110336419

(51) Int. Cl.
 *G06V 20/00* (2022.01)
 *G01S 17/931* (2020.01)
 *G06V 20/56* (2022.01)
(52) U.S. Cl.
 CPC ............ *G06V 20/56* (2022.01); *G01S 17/931* (2020.01)

(58) Field of Classification Search
 CPC ........ G06V 20/00; H04N 23/00; G01S 17/00; G01S 19/00; B60R 1/00
 See application file for complete search history.

(56) References Cited

U.S. PATENT DOCUMENTS

2023/0347821 A1\* 11/2023 You .................... G08G 1/163

FOREIGN PATENT DOCUMENTS

CN 111186387 A 5/2020
JP 2006248374 A 9/2006

OTHER PUBLICATIONS

International Search Report and Written Opinion in International Appln. No. PCT/CN2022/079914, mailed on Jun. 10, 2022, 16 pages (with English translation).

\* cited by examiner

*Primary Examiner* — Maryam A Nasri
(74) *Attorney, Agent, or Firm* — Fish & Richardson P.C.

(57) ABSTRACT

The present disclosure relates to vehicle-mounted collection devices and collection systems. In one example vehicle-mounted collection device, a front-view camera, a rear-view camera, and a laser radar are disposed at front and rear ends of a midline extending in a front-to-back direction of a bottom plate of the device, and parameters such as an angle of view, a downtilt, and a horizontal scanning resolution of the front-view camera, the rear-view camera, and the laser radar are determined based on field of view coverage requirements of the device.

20 Claims, 17 Drawing Sheets

VEHICLE-MOUNTED COLLECTION DEVICE

CROSS-REFERENCE TO RELATED APPLICATIONS

This application is a continuation of International Application No. PCT/CN2022/079914, filed on Mar. 9, 2022, which claims priority to Chinese Patent Application No. 202110336419.4, filed on Mar. 29, 2021. The disclosures of the aforementioned applications are hereby incorporated by reference in their entireties.

TECHNICAL FIELD

This application relates to the field of electronic technologies, and in particular, to a vehicle-mounted collection device.

BACKGROUND

In the conventional technology, a vehicle-mounted collection device is usually provided with four cameras in front, rear, left, and right directions and one or two laser radars. From a perspective of cameras, two cameras are disposed in a front-view direction. Although an overall coverage area can reach 180 degrees, coverage areas of the two cameras greatly overlap, and this is also the case in a rear-view direction. Images collected by different cameras have a large overlapping area, which increases a burden of subsequent image processing. For example, if a three-dimensional map needs to be made based on images collected by the cameras, image cutting and splicing need to be performed on images collected by a plurality of cameras, to splice the images into a complete surrounding image. However, overlapping of the coverage areas of the cameras makes the foregoing steps such as image cutting and splicing complex.

In addition, a structure form of this type of device is usually complex. The device is either large in size and weight and difficult to install, or covers an entire vehicle roof in a distributed manner. Therefore it is not conducive to large-scale application.

It can be learned that the vehicle-mounted collection device in the conventional technology has a complex structure, a large quantity of sensors, and redundant configuration.

SUMMARY

A vehicle-mounted collection device in this embodiment of this application is used to improve collection precision of the device, and avoid a problem of sensor configuration redundancy inside the device.

According to a first aspect, an embodiment of this application provides a vehicle-mounted collection device. The device includes a front-view camera, a rear-view camera, a laser radar, and an industrial computer. The front-view camera is configured to: collect image data in a front-view direction and send the image data to the industrial computer. The rear-view camera is configured to: collect image data in a rear-view direction and send the image data to the industrial computer. The laser radar is configured to: collect point cloud data in the rear-view direction and send the point cloud data to the industrial computer.

The front-view camera, the rear-view camera, and the laser radar are located on a midline extending in a front-to-back direction of a bottom plate of the device; the front-view camera is disposed at a front end of the midline and faces a front of the device; the rear-view camera and the laser radar are disposed at a rear end of the midline and face a back of the device; the laser radar is located on the rear-view camera; an angle of view of the front-view camera is determined based on a field of view coverage requirement in the front-view direction and a maximum vehicle speed supported by the device; and the rear-view camera is disposed at a first downtilt, the laser radar is disposed at a second downtilt, the first downtilt is determined based on a field of view coverage requirement in the rear-view direction and the maximum vehicle speed supported by the device, and the second downtilt is determined based on the field of view coverage requirement in the rear-view direction and the maximum vehicle speed supported by the device.

In this embodiment of this application, the front-view camera, the rear-view camera, and the laser radar are separately disposed at the front and rear ends of the midline in the front-to-back direction of the bottom plate of the device, and parameters such as a field of view, a downtilt, and a horizontal scanning resolution of the front-view camera, the rear-view camera, and the laser radar are selected based on a field of view coverage requirement. This helps reduce a quantity of sensors (such as a camera and a laser radar) used in the vehicle-mounted collection device, and effectively avoid configuration redundancy of various sensors in the vehicle-mounted collection device.

In a possible design, the field of view coverage requirement in the front-view direction includes a horizontal field of view coverage requirement and a vertical field of view coverage requirement, and the field of view coverage requirement in the rear-view direction includes a horizontal field of view coverage requirement and a vertical proportion of a road in a photographed image.

In a possible design, the device further includes a synchronization signal board. The synchronization signal board is configured to send a synchronization signal to the industrial computer and the laser radar, where the synchronization signal is used to implement collection synchronization of the front-view camera, the rear-view camera, and the laser radar. The industrial computer is configured to send a photographing instruction to the front-view camera and the rear-view camera based on the synchronization signal. The front-view camera and the rear-view camera are configured to collect image data according to the photographing instruction; and the laser radar is configured to collect point cloud data based on the synchronization signal.

In this embodiment of this application, the synchronization signal board provides the synchronization signal, so that the front-view camera, the rear-view camera, and the laser radar can be coordinated to implement synchronized collection of image data and point cloud data, thereby effectively reducing burden of subsequent image processing and improving drawing accuracy.

In a possible design, the synchronization signal board is further configured to: receive a wheel speedometer signal, and send the wheel speedometer signal to the industrial computer and the laser radar, where the wheel speedometer signal indicates a vehicle speed, and the vehicle-mounted collection device is installed on the vehicle; the industrial computer is further configured to send an adjustment instruction to the front-view camera and the rear-view camera based on the vehicle speed, where the adjustment instruction is used to instruct the front-view camera and the rear-view camera to adjust collection parameters; and the laser radar is further configured to adjust a collection parameter based on the vehicle speed.

In a possible design, the collection parameter of the front-view camera includes a frame rate or exposure time; the collection parameter of the rear-view camera includes a frame rate or exposure time; and the collection parameter of the laser radar includes a frame rate or a horizontal scanning resolution.

In this embodiment of this application, the synchronization signal board provides the wheel speedometer signal, so that the device can dynamically adjust collection parameters of the front-view camera, the rear-view camera, and the laser radar based on a real-time vehicle speed of a vehicle on which the device is currently installed, to ensure that the camera and the laser radar can collect images and point clouds with high quality and high definition at different vehicle speeds, thereby improving drawing accuracy and meeting a requirement of a drawing platform.

In a possible design, the device further includes a GPS antenna, a GNSS board, and a power splitter, where the GPS antenna is configured to receive positioning data from a satellite; the power splitter is configured to send the positioning data from the GPS antenna to the GNSS board; the GNSS board is configured to: position the device based on the received positioning data, and send an obtained position signal to the industrial computer; the industrial computer is configured to: send a photographing instruction to the front-view camera and the rear-view camera based on the synchronization signal and the position signal, and send the position signal to the laser radar; and the laser radar is configured to collect the point cloud data based on the synchronization signal and the position signal.

In this embodiment of this application, the GNSS board provides the position signal, so that the front-view camera, the rear-view camera, and the laser radar can collect the image or the point cloud based on the synchronization signal from the synchronization signal board and the position signal from the GNSS board. In addition, each frame of image collected by the front-view camera, the rear-view camera, and the laser radar may correspond to one piece of accurate position information, thereby effectively improving drawing precision and meeting a requirement of a drawing platform.

In a possible design, the device further includes an IMU, where the power splitter is further configured to send the positioning data from the GPS antenna to the IMU; the IMU is configured to: determine a posture parameter of the device based on the positioning data, and send the posture parameter to the synchronization signal board; and the synchronization signal board is configured to generate the synchronization signal based on the posture parameter.

In a possible design, a heat dissipation structure is disposed on the bottom plate of the device, and the heat dissipation structure is configured to perform ventilation and heat dissipation on the device.

In a possible design, the heat dissipation structure includes an air intake vent and an air exhaust vent, where the air intake vent is disposed at a front part of the bottom plate of the device and has a front opening, and the air exhaust vent is disposed at a rear part of the bottom plate of the device and has a rear opening.

In a possible design, a connection structure is disposed on the bottom plate of the device, the connection structure is used to implement a rigid connection between the bottom plate of the device and a support of the vehicle, and the connection structure has a shock absorption function.

In a possible design, the connection structure includes a profile member, a steel wire shock absorption spring, and a leveling block, where the leveling block is configured to level the bottom plate of the device.

In this embodiment of this application, the heat dissipation structure and the connection structure are disposed on the bottom plate of the device, so that the device can meet various engineering requirements such as ventilation, heat dissipation, waterproofing, and shock absorption when the device is installed on the top of the vehicle, thereby meeting a requirement of field collection, and facilitating large-scale promotion and application of the device.

According to a second aspect, an embodiment of this application provides a collection system, where the system includes a vehicle-mounted collection device and a vehicle, and the vehicle-mounted collection device is installed on a top of the vehicle.

DESCRIPTION OF EMBODIMENTS

To make objectives, technical solution, and advantages of embodiments of this application clearer, the following further describes embodiments of this application in detail with reference to the accompanying drawings.

The vehicle-mounted collection device provided in this embodiment of this application is used to collect a geographic image, and mainly includes photographing images of a road lane line, an indicator above a road, an indication sign, and two edges of a road. After the image is processed by software, a common three-dimensional map can be created.

Figure 1:
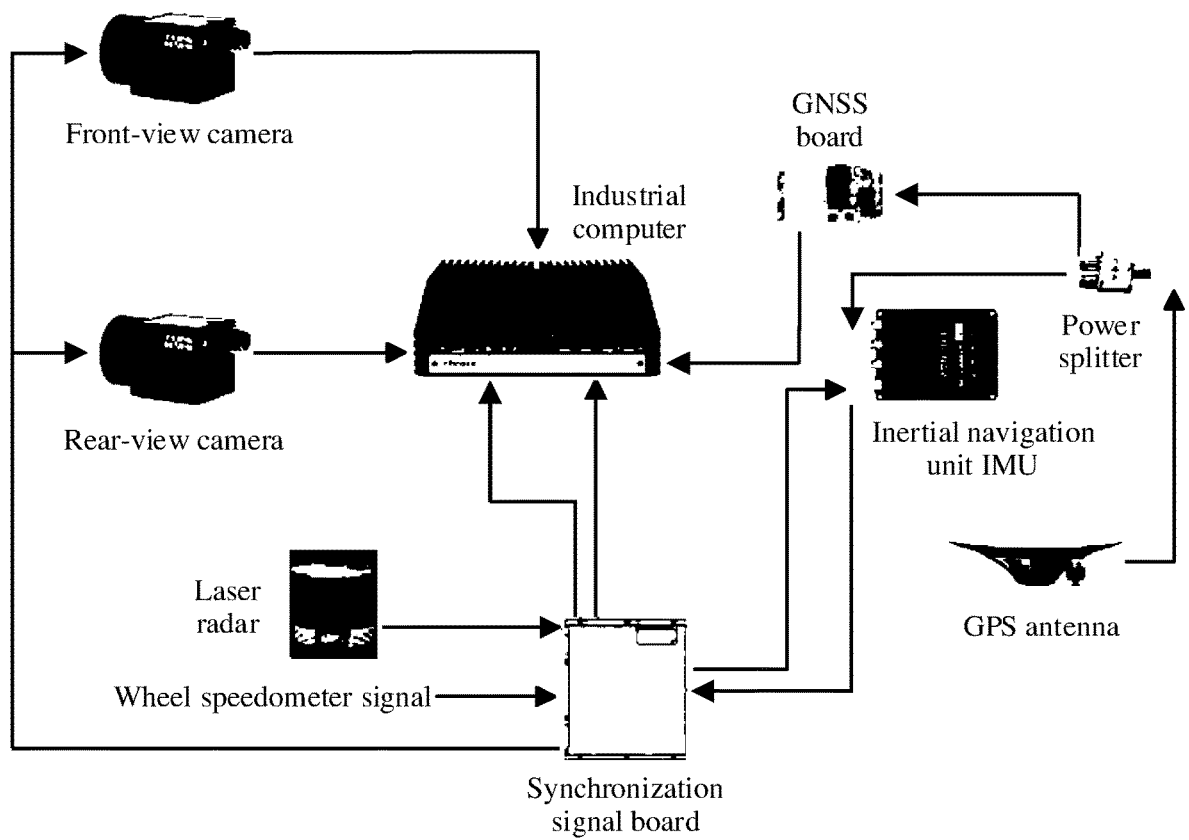
FIG. 1 is a schematic diagram of hardware components and signal directions of a vehicle-mounted collection device according to an embodiment of this application.
Figure 2:
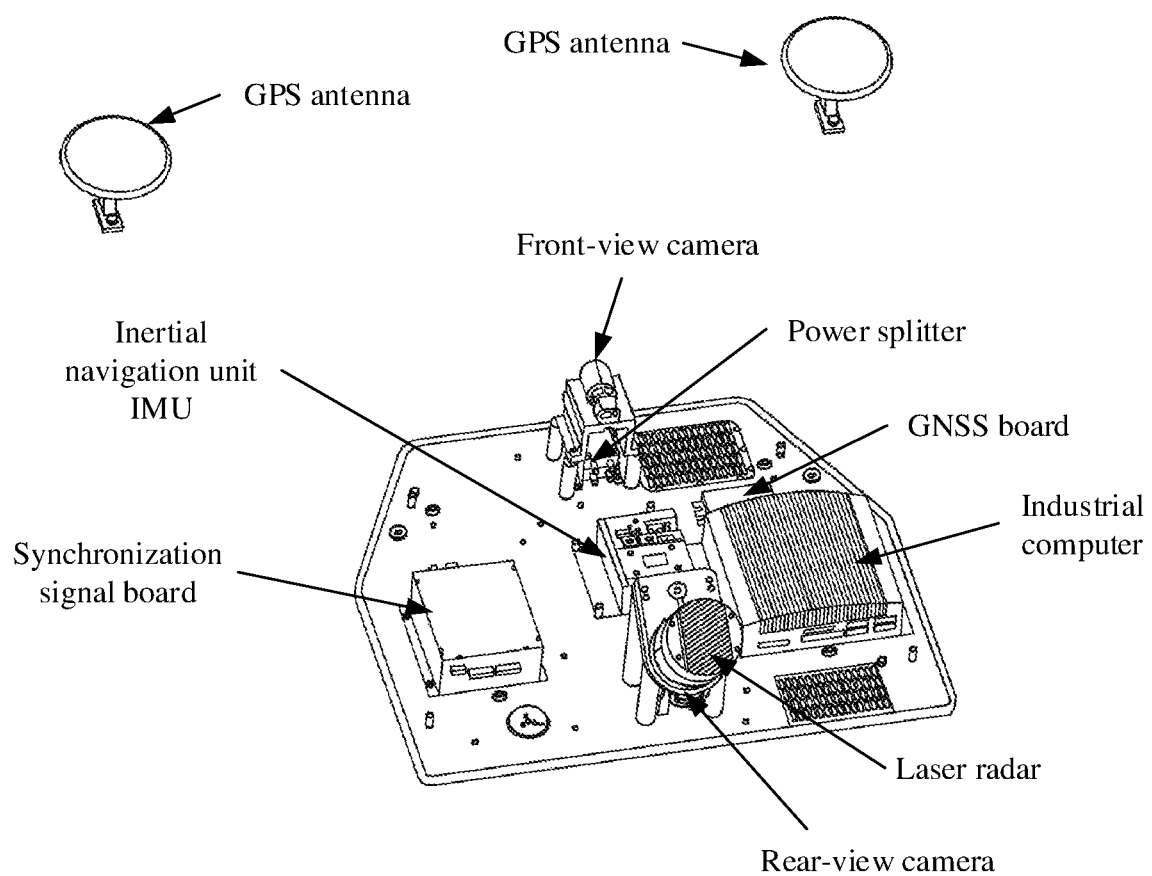
FIG. 2 is a schematic diagram of a hardware layout of a vehicle-mounted collection device according to an embodiment of this application.

FIG. 1 is a schematic diagram of hardware components and signal directions of a vehicle-mounted collection device according to an embodiment of this application. FIG. 2 is a schematic diagram of a hardware layout of the vehicle-mounted collection device according to the embodiment of this application.

As shown in FIG. 1 and FIG. 2, the vehicle-mounted collection device includes a front-view camera, a rear-view camera, a laser radar, an industrial computer, and a synchronization signal board. Further, the vehicle-mounted collection device may further include a global positioning system (GPS) antenna, a global navigation satellite system (GNSS) board, an inertial measurement unit (IMU), a power splitter, and the like.

Various sensors or other components included in the vehicle-mounted collection device are distributed on a bottom plate of the device. Specifically, the front-view camera, the rear-view camera, and the laser radar are located on a midline extending in a front-to-back direction of the bottom plate of the device. The front-view camera is disposed at a front end of the midline, faces a front of the device, and is configured to: collect image data in a front-view direction of the device and send the image data to the industrial computer. The rear-view camera is disposed at a rear end of the midline, faces a back of the device, and is configured to collect image data in a rear-view direction of the device and send the image data to the industrial computer. The laser radar is disposed at the rear end of the midline, faces the rear of the device, but is located on the rear-view camera, and is configured to: collect point cloud data in the rear-view direction and send the point cloud data to the industrial computer.

In this embodiment of this application, an angle of view of the front-view camera is determined based on a field of view coverage requirement in the front-view direction and a maximum vehicle speed supported by the vehicle-mounted collection device, to ensure that the front-view camera can clearly photograph a front field of view in a specified range within a vehicle speed range supported by the vehicle-mounted collection device, thereby meeting a drawing requirement.

For example, the maximum vehicle speed supported by the vehicle-mounted collection device may be 80 km/h.

Figure 3:
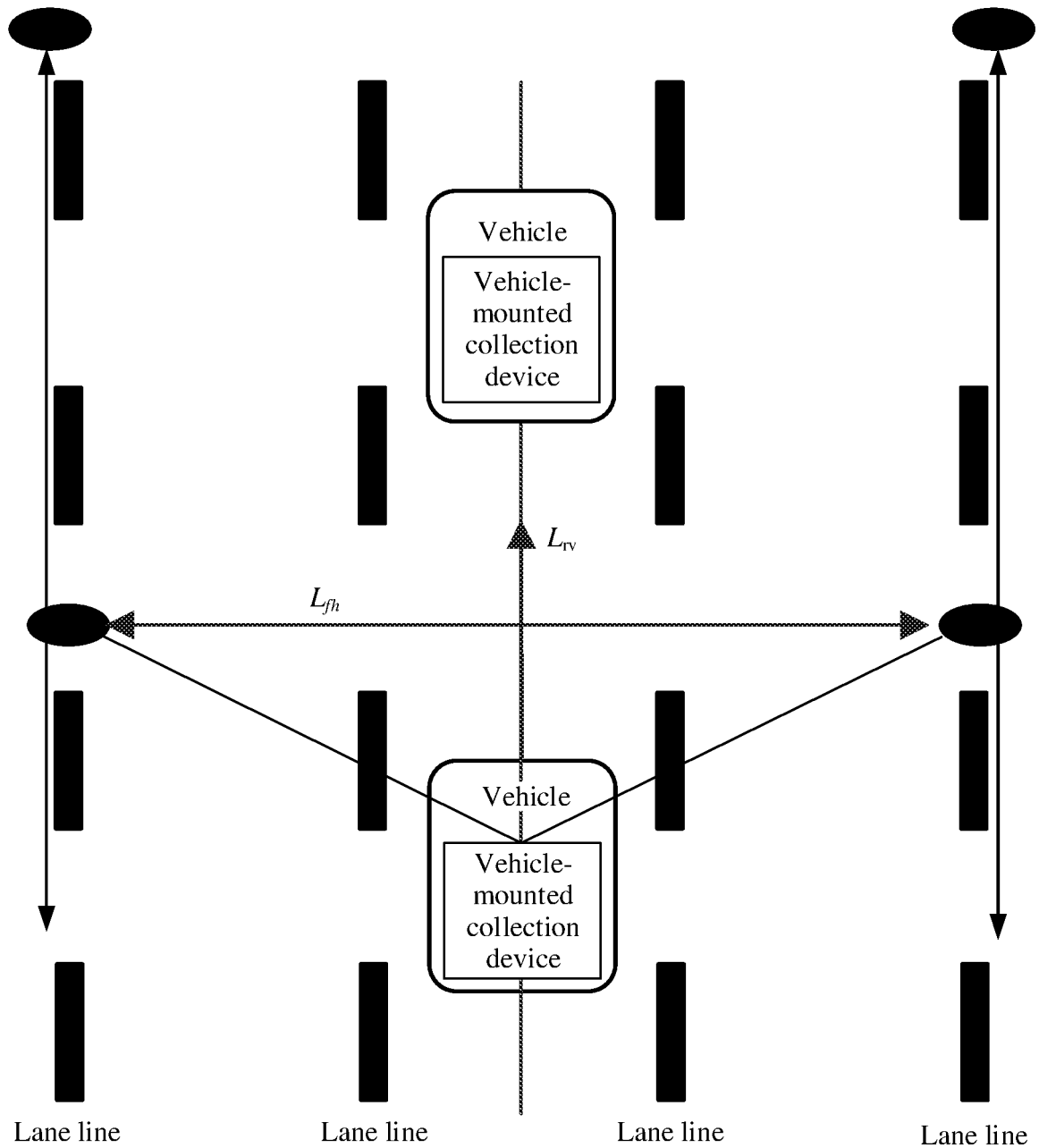
FIG. 3 is a schematic diagram of a horizontal coverage area of a front-view camera according to an embodiment of this application.
Figure 4:
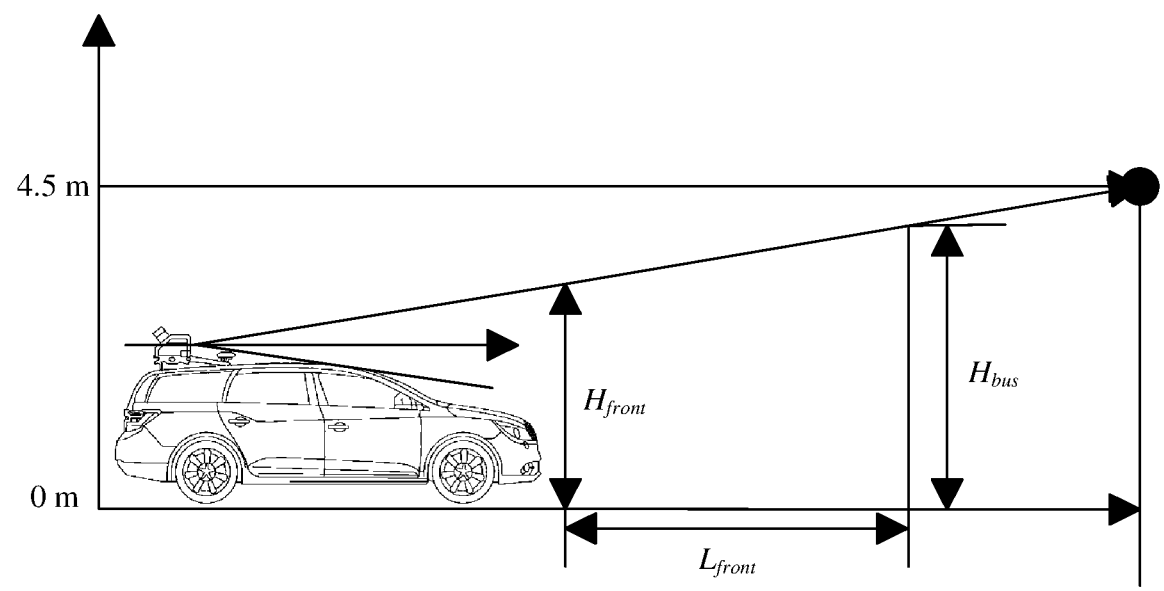
FIG. 4 is a schematic diagram of a vertical coverage area of a front-view camera according to an embodiment of this application.

The field of view coverage requirement in the front-view direction may be further classified into a horizontal field of view coverage requirement and a vertical field of view coverage requirement. The field of view coverage requirement in the front-view direction specifically includes: In a horizontal direction, the front-view camera is used to photograph a road width of $L_{fh}$ within a range of $L_{front}$ in the front, where $L_{fh}$ covers at least three lanes, and a width of each lane is about 3.5; and in a vertical direction, the front-view camera is used to photograph a field of view within a range of $L_{front}$ in the front and important signs such as a notice board and a signal indicator above a road, where a maximum height of these important signs is about 4.5 m, and even if there is an obstacle (such as a large truck) with a height of $H_{bus}$ in the front, the front-view camera cannot be affected in photographing these important signs. $L_{front}$ is a minimum distance headway, and $L_{front}$ is directly related to a current vehicle speed. $L_{front}$ is greater when a vehicle speed is larger. Based on the field of view coverage requirement, a horizontal coverage area and a vertical coverage area of the front-view camera may be respectively shown in FIG. 3 and FIG. 4.

Figure 5:
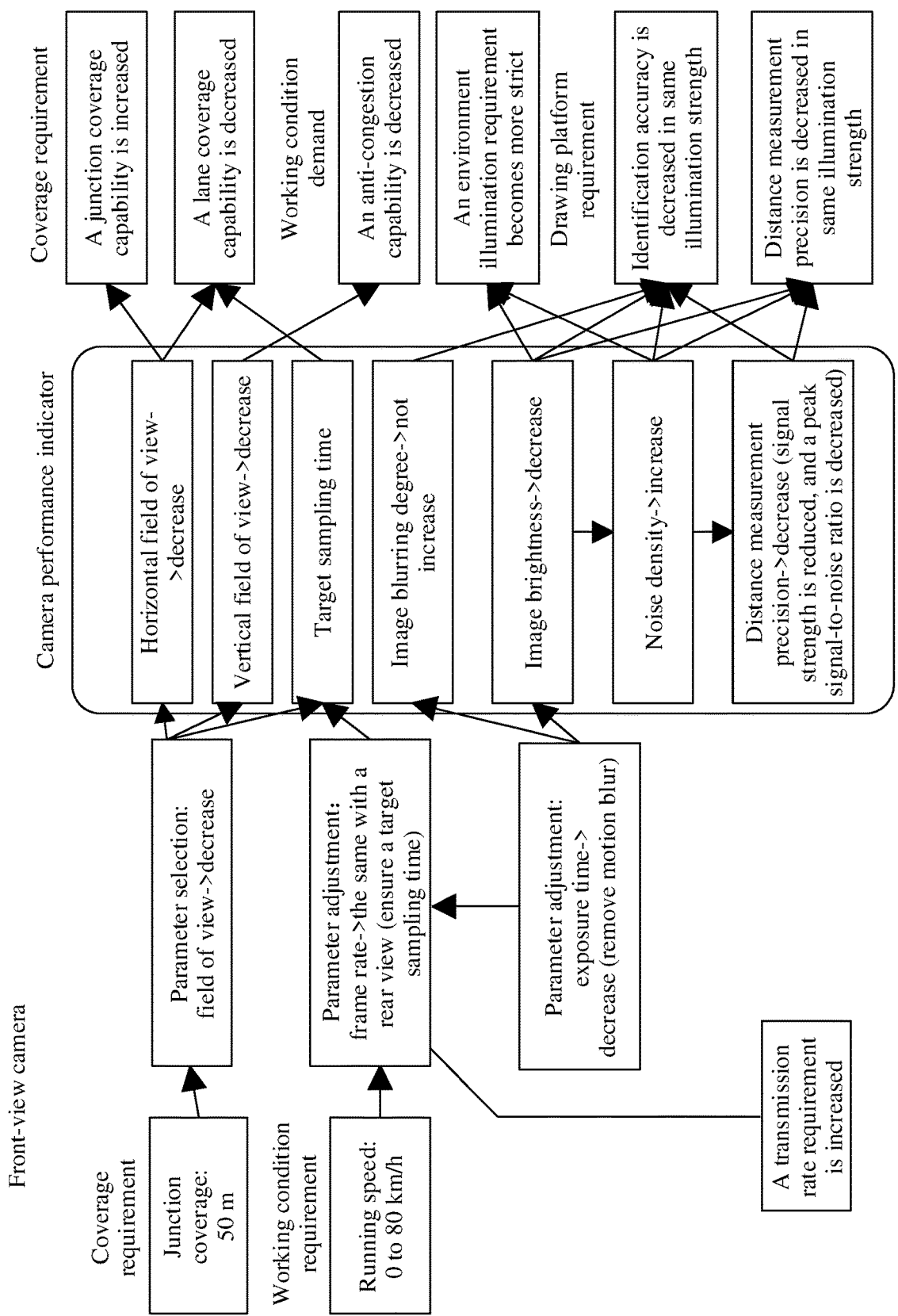
FIG. 5 is a schematic diagram of a parameter impact relationship of a front-view camera according to an embodiment of this application.

FIG. 5 is a schematic diagram of a parameter impact relationship of the front-view camera. As shown in FIG. 5, photographing quality of the front-view camera is affected by the field of view coverage requirement in the front-view direction, the vehicle speed, a frame rate, and exposure time.

Figure 6A:
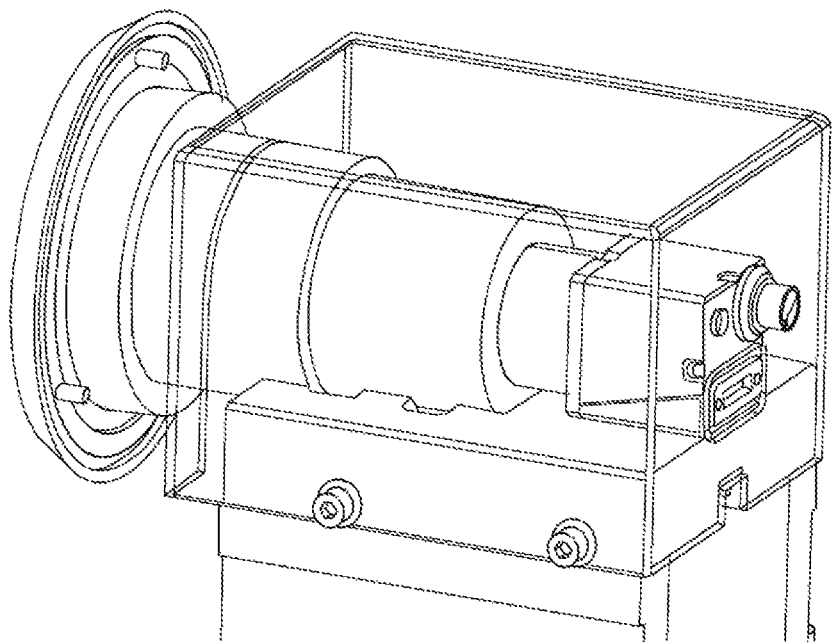
FIG. 6a and FIG. 6b are schematic diagrams of a front-view camera and an installation structure of the front-view camera according to an embodiment of this application.
Figure 6B:
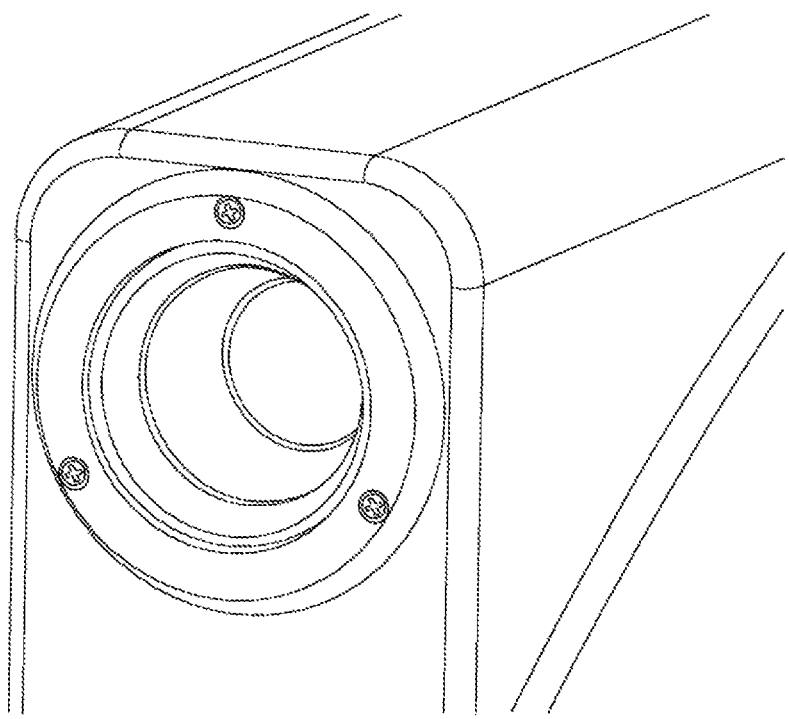

FIG. 6a and FIG. 6b are schematic diagrams of the front-view camera and an installation structure of the front-view camera in the vehicle-mounted collection device. As shown in FIG. 6a and FIG. 6b, the front-view camera is disposed facing the front of the device, a principal optical axis of the front-view camera is located in a horizontal plane, and a direction of the principal optical axis is consistent with a driving direction of a vehicle on which the vehicle-mounted collection device is installed, and does not tilt in a left-right direction. The front-view camera is fastened to a front support inside the device. The front-view camera scans the front field of view by using high-transparent glass fastened to a front end of a device cover. A sealing cover is installed on the front-view camera. A rubber pad and a glass cover are used in front of a camera lens to implement sealing and reduce an impact of damp air on the front-view camera. The foregoing installation structure can effectively improve stability of the front-view camera, and enhance a protection capability of the front-view camera.

An angle of view of the rear-view camera may be determined based on a field of view coverage requirement in the rear-view direction and the maximum vehicle speed supported by the vehicle-mounted collection device, to ensure that the rear-view camera can photograph a rear field of view in a specified range within the vehicle speed range supported by the vehicle-mounted collection device, thereby meeting a drawing requirement.

Unlike the front-view camera, the rear-view camera focuses on a rear road, and is used to ensure that lane lines on the road are clearly photographed. Therefore, the rear-view camera is set at a first downtilt, where the first downtilt is an included angle between a principal optical axis of the rear-view camera and a horizontal plane, and is denoted as $\theta_{camera}$.

Figure 7:
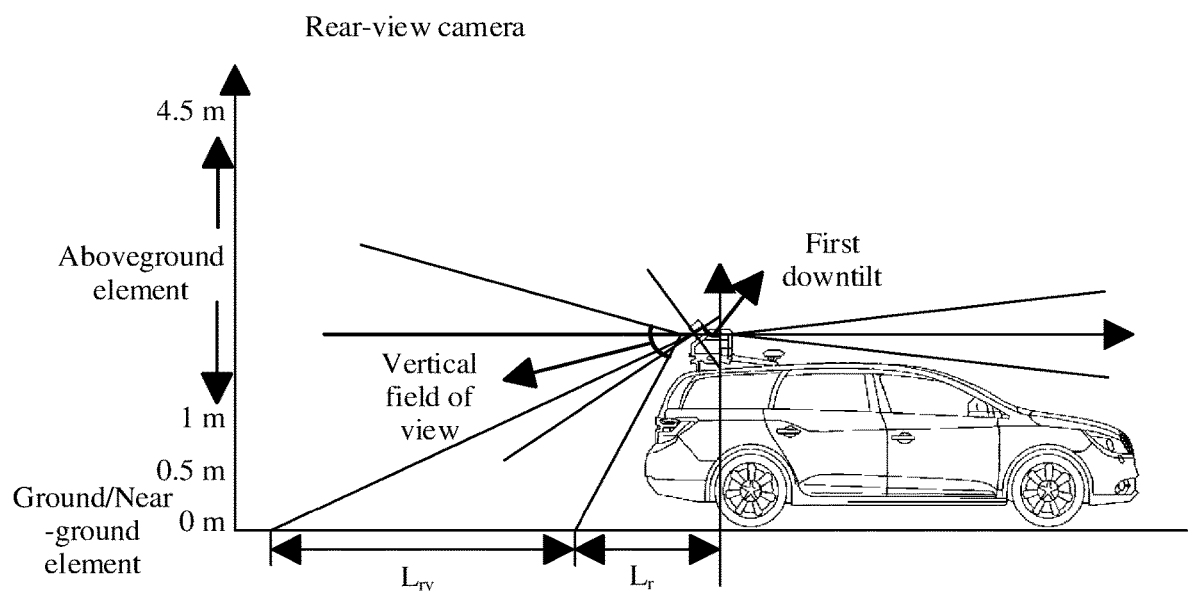
FIG. 7 is a schematic diagram of a first downtilt and a vertical coverage area of a rear-view camera according to an embodiment of this application.

FIG. 7 is a schematic diagram of the first downtilt and a vertical coverage area of the rear-view camera. The first downtilt is determined based on the field of view coverage requirement in the rear-view direction and the maximum vehicle speed supported by the vehicle-mounted collection device. When a different first downtilt is set for the rear-view camera, a range that can be actually photographed by the rear-view camera is also different, and a range of a near-end blind area $L_{rr}$ that cannot be photographed by the rear-view camera and a range of a rear road $L_{rv}$ that can be photographed by the rear-view camera also change. It may be understood that a larger first downtilt indicates a smaller actual photographing range of the rear-view camera, and a lane coverage capability is weakened, a proportion of the rear road Li, in a photographed image is increased, and an overlapping rate (that is, an inter-frame overlapping range) between a photographed last frame of image and a photographed next frame of image is reduced.

Figure 8:
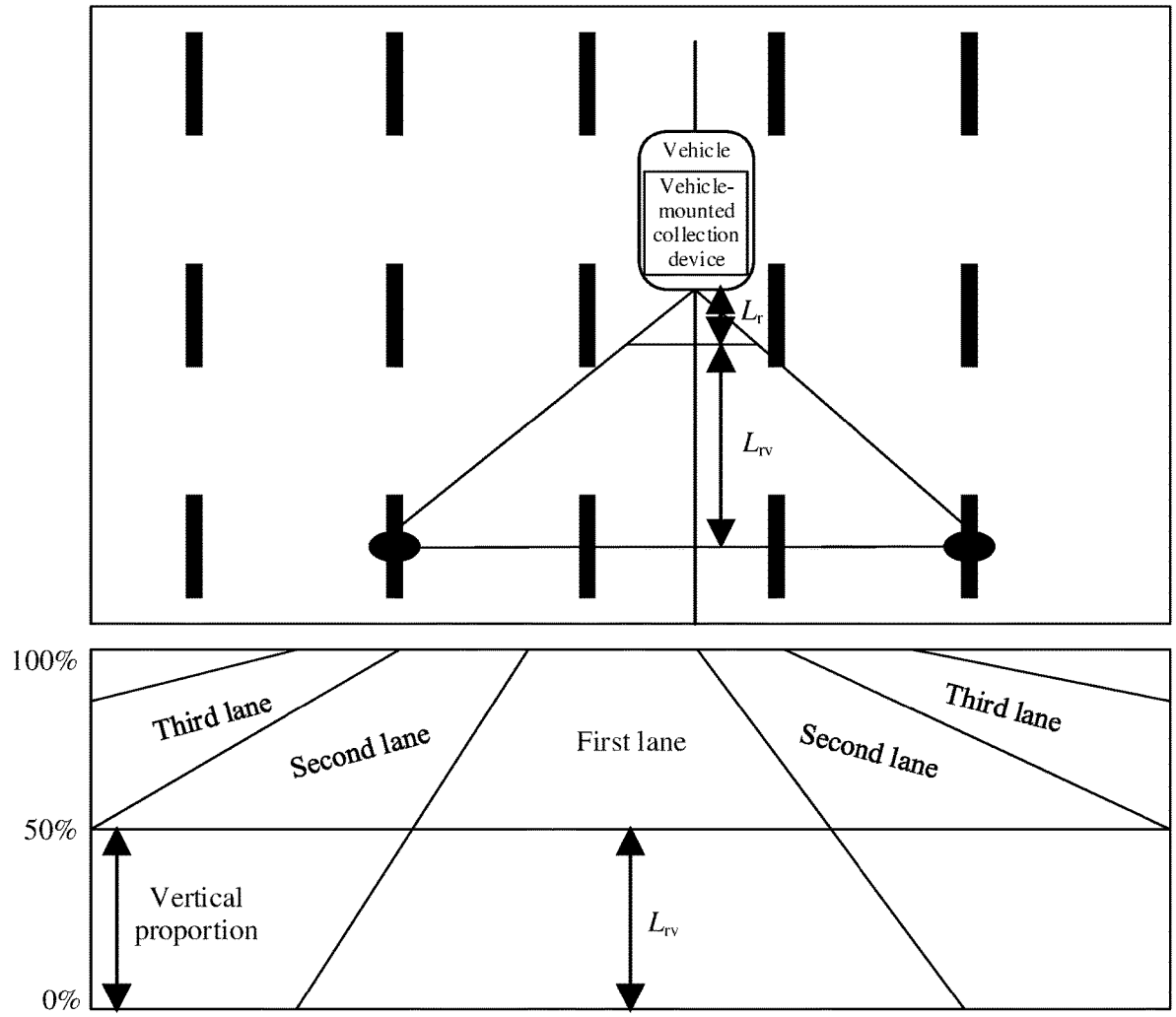
FIG. 8 is a schematic diagram of a horizontal coverage area of a rear-view camera according to an embodiment of this application.

The field of view coverage requirement in the rear-view direction includes a horizontal field of view coverage requirement and a vertical proportion requirement of a road in the photographed image. For example, the horizontal field of view coverage requirement is that the rear-view camera is used to photograph a road width of $L_{fn}$ in the back, and Lin covers at least three lanes. The vertical proportion requirement of the road in the photographed image is that, to clearly photograph an information element, for example, a lane line on the road, it needs to be ensured that the rear road $L_{rv}$ occupies a specific proportion, for example, 50%, in an image photographed by the rear-view camera. It should be noted that the vertical proportion requirement of the road in the photographed image is not as large as possible, nor is as small as possible. Instead, a proper interval range of a vertical proportion is determined based on comprehensive consideration of a coverage area of the image and a collection frame rate of the camera. Based on the field of view coverage requirement, a horizontal coverage area of the rear-view camera may be shown in FIG. 8.

Figure 9:
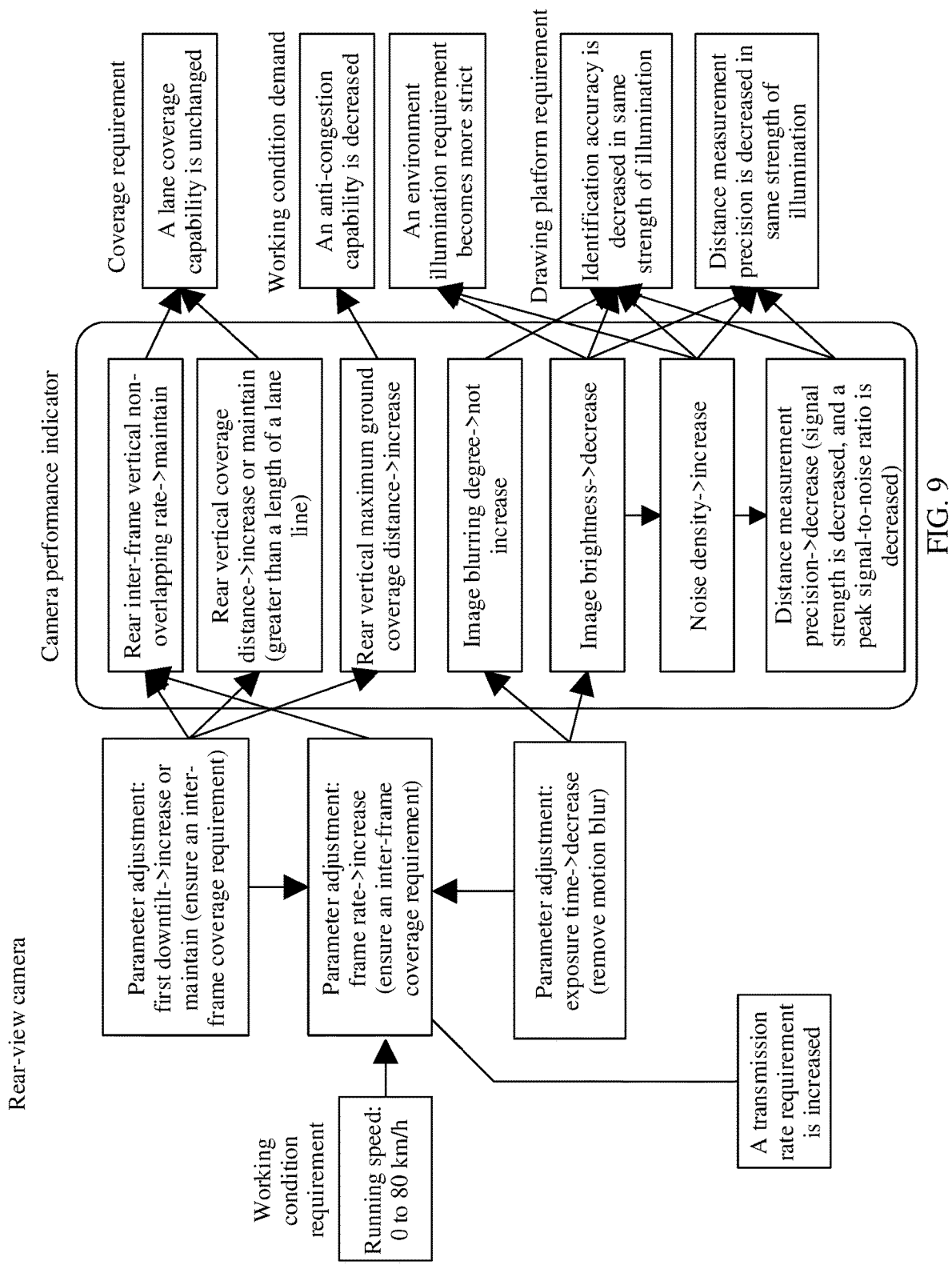
FIG. 9 is a schematic diagram of a parameter impact relationship of a rear-view camera according to an embodiment of this application.

FIG. 9 is a schematic diagram of a parameter impact relationship of the rear-view camera. As shown in FIG. 9, photographing quality of the rear-view camera is affected by a vehicle speed, a frame rate, and exposure time.

Figure 10A:
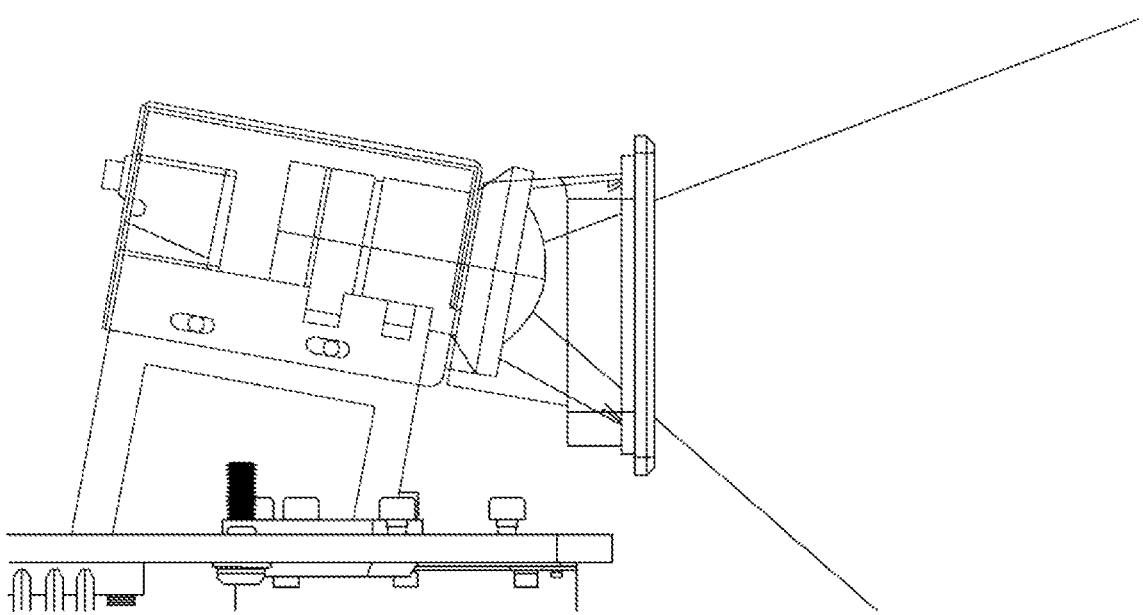
FIG. 10a and FIG. 10b are schematic diagrams of a rear-view camera and an installation structure of the rear-view camera according to an embodiment of this application.
Figure 10B:
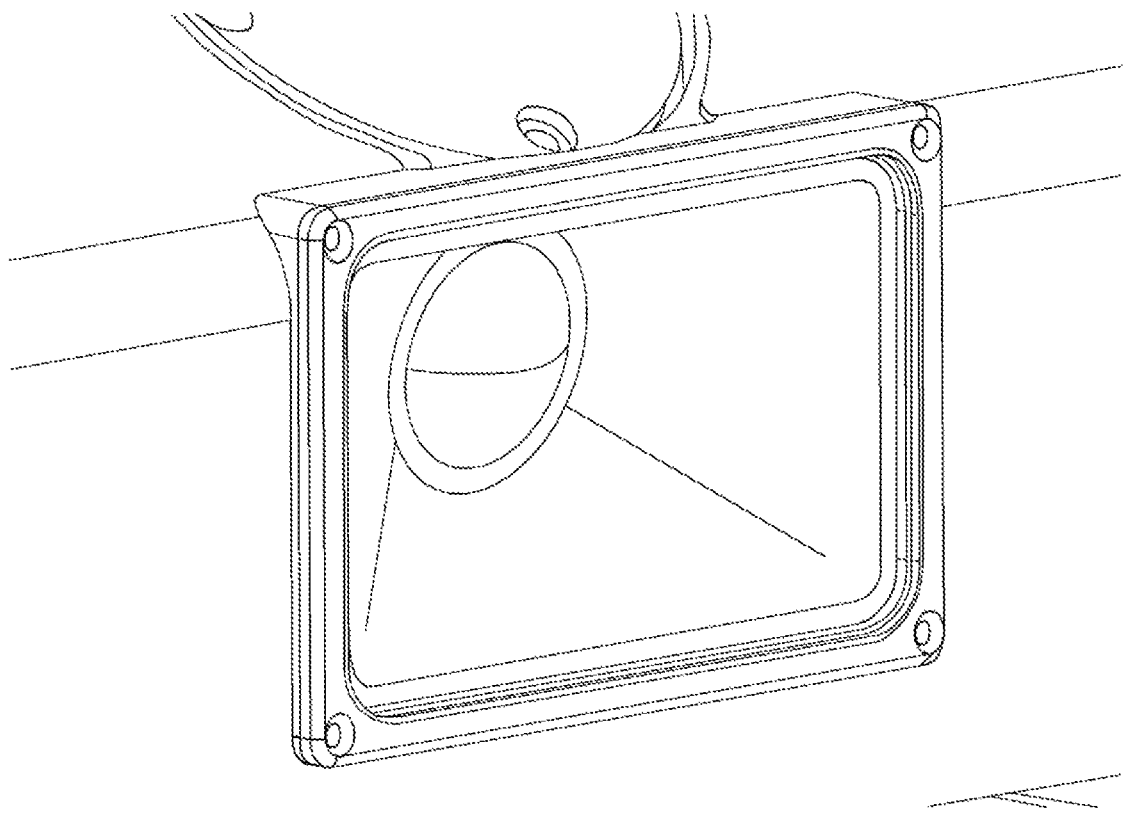

FIG. 10a and FIG. 10b are schematic diagrams of the rear-view camera and an installation structure of the rear-view camera in the vehicle-mounted collection device. As shown in FIG. 10a and FIG. 10b, the rear-view camera is fastened to a rear support inside the device, the support tilts downward at a specific angle, and the rear-view camera scans the rear field of view by using high-transparent glass fastened to the front end of the device cover. A sealing cover is installed on the rear-view camera. A rubber pad and a glass cover are used in front of a camera lens to implement sealing and reduce an impact of damp air on the rear-view camera. The foregoing installation structure can effectively improve stability of the rear-view camera, and enhance a protection capability of the rear-view camera.

The laser radar covers most of ground behind the vehicle and environment on both sides of the road to generate a point cloud. A scanning range of the laser radar on the ground and left and right sides needs to be even, and a coverage area of the laser radar further needs to be consistent with the coverage area of the rear-view camera, so that a point cloud collected by the laser radar and an image photographed by the rear-view camera are mutually verified subsequently, thereby improving drawing accuracy. Therefore, the laser radar may be set to a second downtilt, where the second downtilt is an included angle between a central axis and a horizontal plane of laser scanning, and is denoted as $\theta_{Lidar}$.

Figure 11:
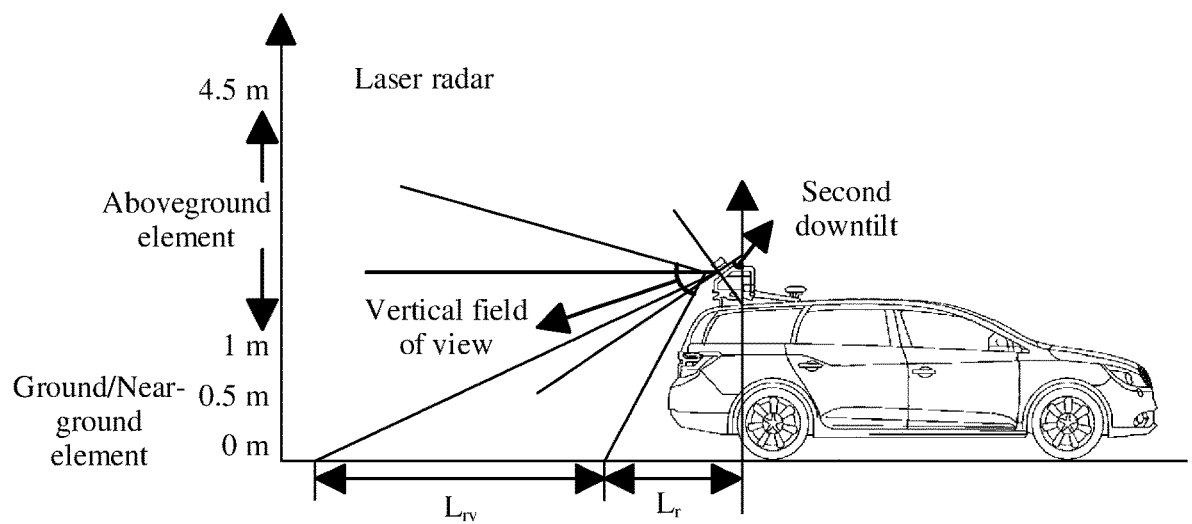
FIG. 11 is a schematic diagram of a second downtilt and a vertical coverage area of a laser radar according to an embodiment of this application.

FIG. 11 is a schematic diagram of the second downtilt and a vertical coverage area of the laser radar. The second downtilt is also determined based on the field of view coverage requirement in the rear-view direction and the maximum vehicle speed supported by the vehicle-mounted collection device. When a different second downtilt is set for the laser radar, a range that can be actually scanned by the laser radar is also different, and a range of a near-end blind area $L_r$ that cannot be scanned by the laser radar and a range of a rear road $L_{rv}$ that can be scanned by the laser radar also change. It may be understood that a smaller second downtilt indicates a higher point cloud density, a lower ground scanning coverage capability, lower image definition, and higher difficulty in extracting lane lines and notice boards. A larger second downtilt indicates a smaller vertical scanning interval, a larger rear-side inter-frame interval, lower ranging precision, and lower extracted elements.

Figure 12:
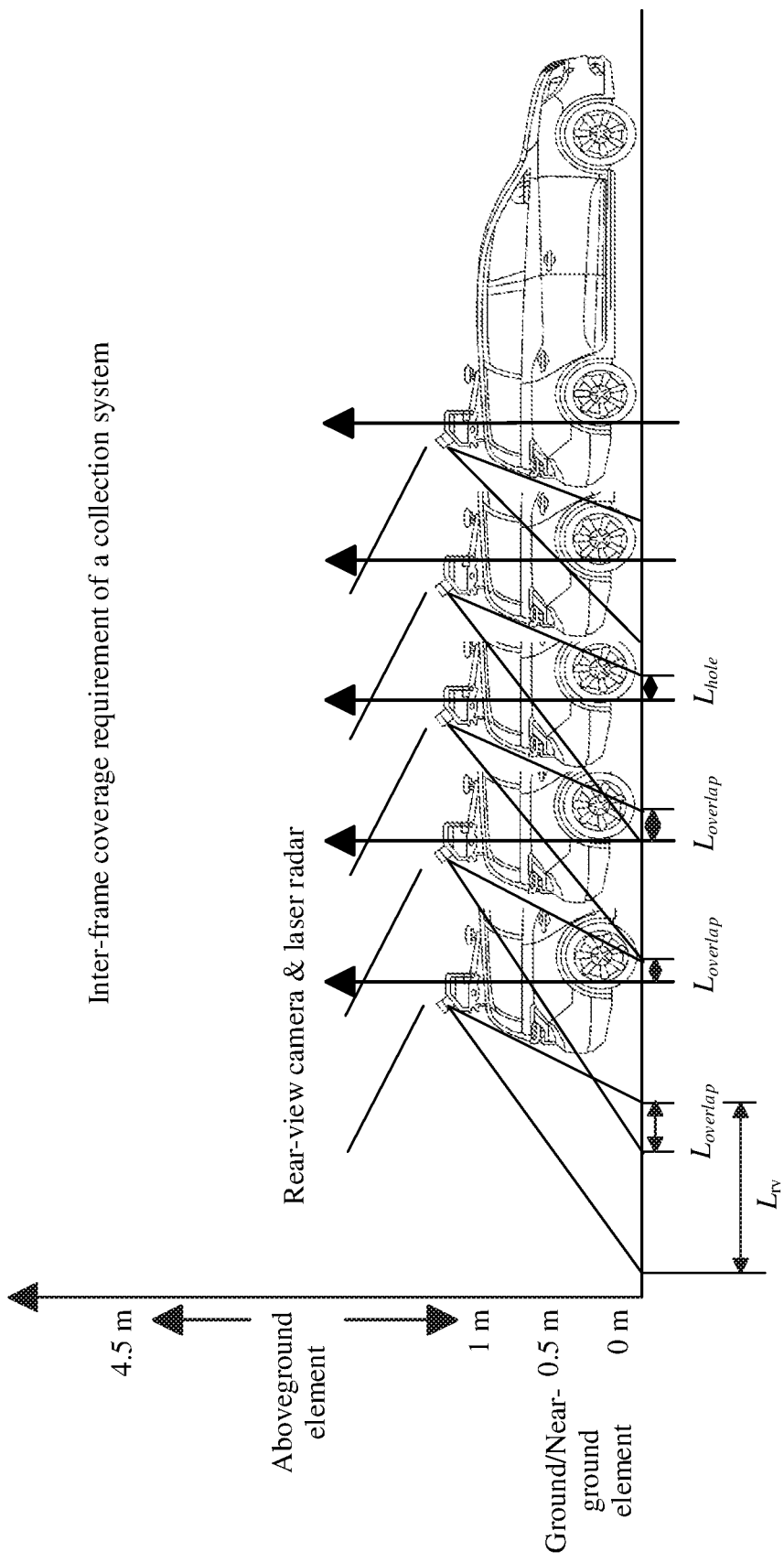
FIG. 12 is a schematic diagram of inter-frame coverage requirements of a rear-view camera and a laser radar according to an embodiment of this application.

It should be noted that, in this embodiment of this application, when collection is performed at a specific vehicle speed, the rear-view camera and the laser radar need to meet a requirement of a specific inter-frame image overlapping rate. As shown in FIG. 12, the inter-frame image overlapping rate means that images collected by the rear-view camera and the laser radar need to implement continuously covering, a last frame of image and a next frame of image need to be continuous, and an inter-frame coverage range $L_{overlap}$ needs to occupy a specific proportion in each frame of image. If neither the last frame of image nor the next frame of image covers an area on the ground and $L_{hole}$ occurs, there is a blank area in a final three-dimensional map, which affects accuracy of the map.

Figure 13:
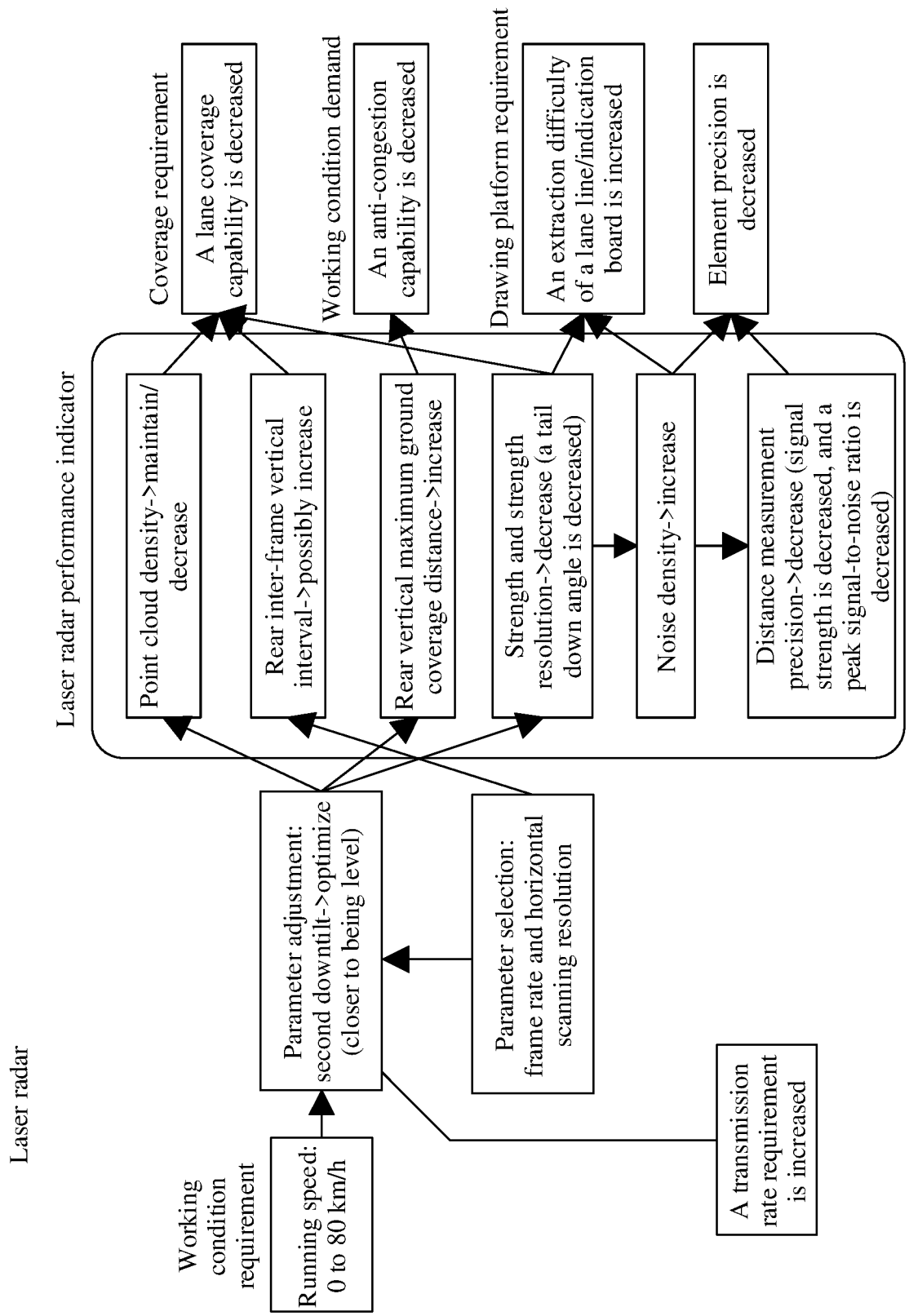
FIG. 13 is a schematic diagram of a parameter impact relationship of a laser radar according to an embodiment of this application.

FIG. 13 is a schematic diagram of a parameter impact relationship of the laser radar. As shown in FIG. 13, photographing quality of the laser radar is affected by a vehicle speed, a frame rate, and a horizontal scanning resolution.

Figure 14A:
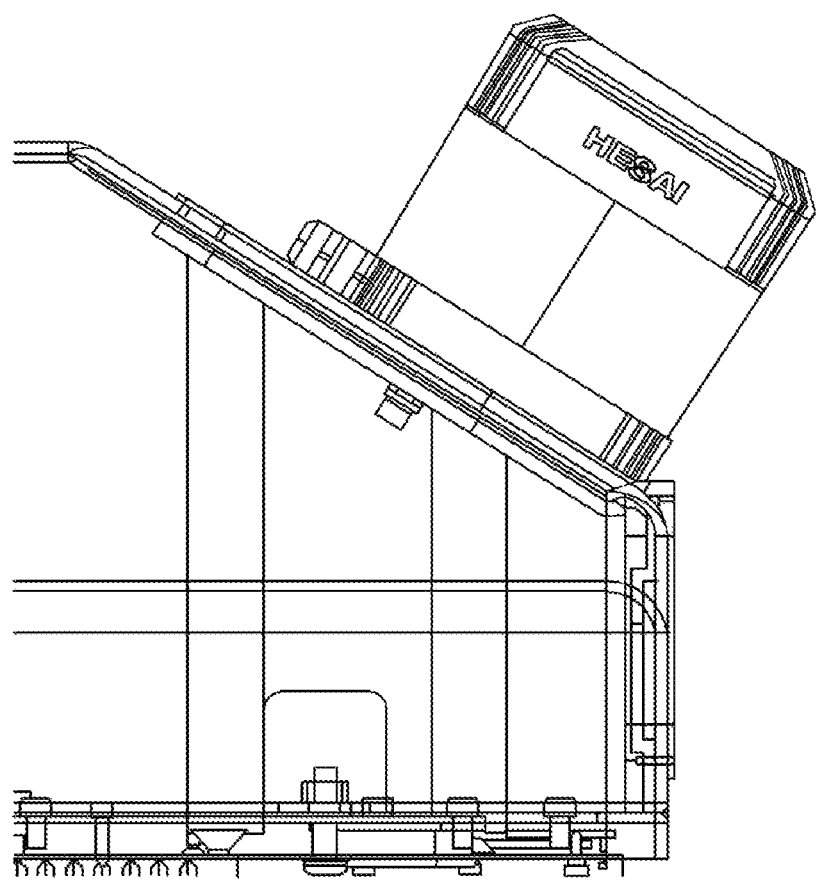
FIG. 14a and FIG. 14b are schematic diagrams of a laser radar and an installation structure of the laser radar according to an embodiment of this application.
Figure 14B:
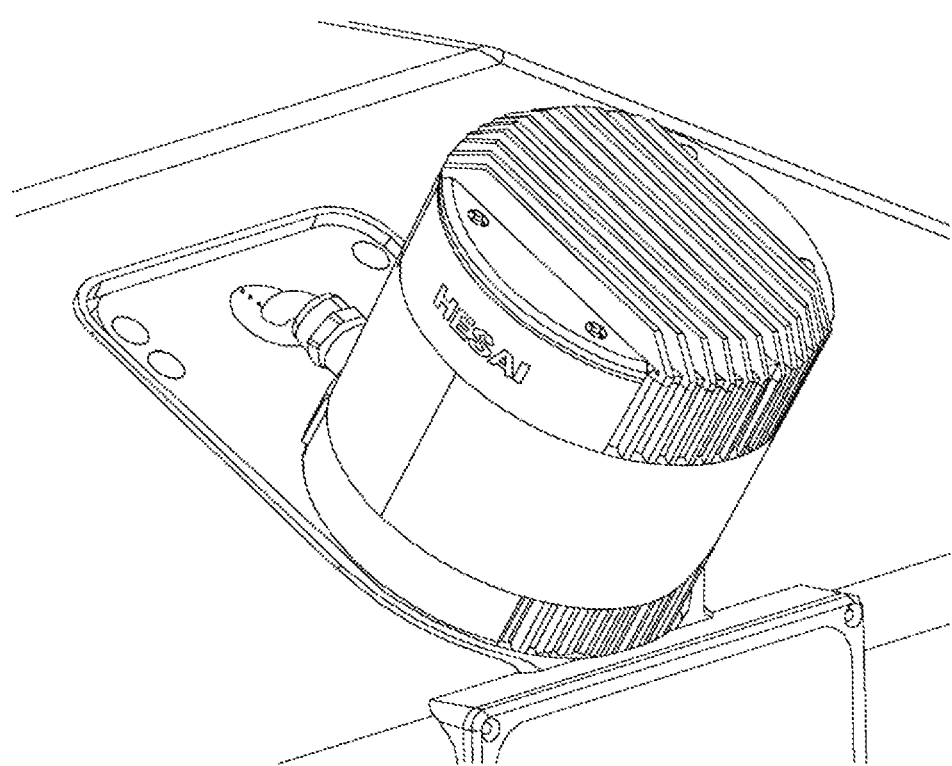
Figure 15:
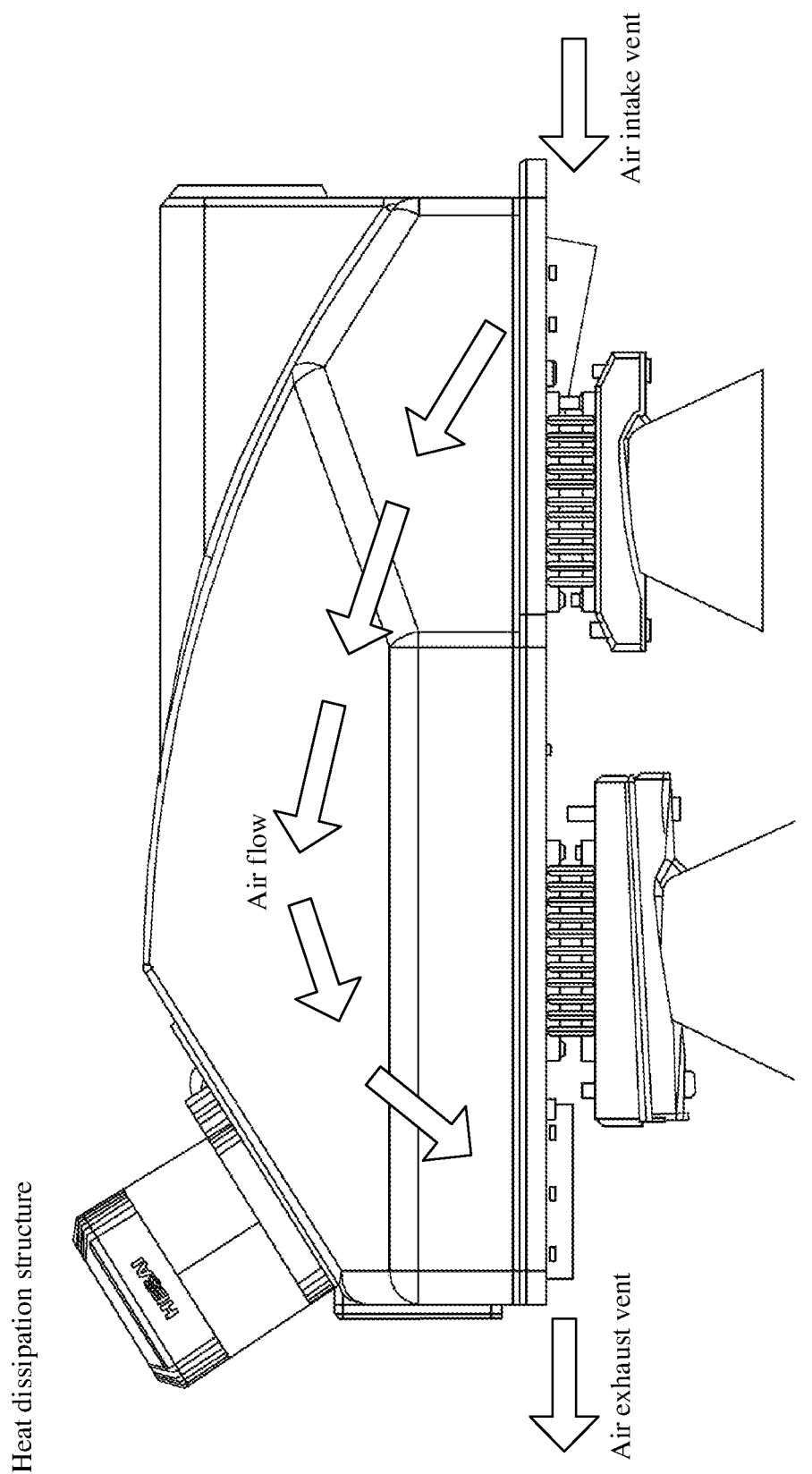
FIG. 15 is a schematic diagram of a heat dissipation structure of a vehicle-mounted collection device according to an embodiment of this application.

FIG. 14a and FIG. 14b are schematic diagrams of the laser radar and an installation structure of the laser radar in the vehicle-mounted collection device. As shown in FIG. 14a and FIG. 14b, the laser radar is fastened to the bottom plate inside the device by using a column structure, and passes through the cover. Double-layer sealing is implemented between the column and the cover, and angle precision is within 0.2 degrees.

In this embodiment of this application, parameters such as a field of view angle, a downtilt, and a horizontal scanning resolution of the front-view camera, the rear-view camera, and the laser radar are selected based on a field of view coverage requirement. This helps reduce a quantity of sensors used in the vehicle-mounted collection device, and effectively avoid configuration redundancy of various sensors (such as a camera and a laser radar) in the vehicle-mounted collection device. For example, a front-view camera with an appropriate angle of view is selected in the foregoing manner, so that a collection requirement can be met by disposing one camera in a front-view direction for photographing. Similarly, a rear-view camera with an appropriate angle of view is selected, and a downtilt of the rear-view camera is properly set, so that a collection requirement can be met by disposing one camera in a rear-view direction for photographing an image. Similarly, in the foregoing manner, a laser radar with an appropriate horizontal scanning resolution is selected, and a downtilt of the laser radar is properly set, so that all ideal point cloud images can be collected by disposing the laser radar only in the rear-view direction. In addition, after analysis, because a blind area in front of the vehicle is large, a laser radar does not need to be disposed in the front of the vehicle to perform repeated scanning.

The industrial computer and the synchronization signal board are respectively disposed on two sides of the midline extending in the front-to-back direction on the bottom plate of the device. The industrial computer is configured to: control the front-view camera and the rear-view camera to perform collection, receive the image data collected by the front-view camera and the rear-view camera, and the point cloud data collected by the laser radar, and process the received image data and point cloud data. The synchronization signal board is configured to provide a synchronization signal for the front-view camera, the rear-view camera, and the laser radar, to implement collection synchronization of the front-view camera, the rear-view camera, and the laser radar.

It should be noted that, in this embodiment of this application, the synchronization signal board may directly exchange a signal or an instruction with the industrial computer and the laser radar, and the synchronization signal board may exchange a signal or an instruction with the front-view camera or the rear-view camera by processing and forwarding by the industrial computer.

The synchronization signal board can send a synchronization signal to the industrial computer and the laser radar. The industrial computer can send a photographing instruction to the front-view camera and the rear-view camera based on the synchronization signal received from the synchronization signal board, and the front-view camera and the rear-view camera collect the image data according to the photographing instruction. The laser radar can collect the point cloud data based on the synchronization signal received from the synchronization signal board.

For example, the synchronization signal may be a rectangular pulse signal. In this way, the industrial computer may send the photographing instruction to the front-view camera and the rear-view camera when a rising edge or a falling edge of the synchronization signal arrives, to trigger the front-view camera and the rear-view camera to collect the image data at a moment of the rising edge or the falling edge of the synchronization signal. The laser radar may collect the point cloud data when the rising edge or the falling edge of the synchronization signal arrives.

In this embodiment of this application, the synchronization signal board provides the synchronization signal, so that the front-view camera, the rear-view camera, and the laser radar can be coordinated to implement synchronized collection of image data and point cloud data, thereby effectively reducing burden of subsequent image processing and improving drawing accuracy.

The synchronization signal board may further receive a wheel speedometer signal, and send the wheel speedometer signal to the industrial computer and the laser radar. The wheel speedometer signal is from a wheel speedometer of the vehicle on which the vehicle-mounted collection device is installed, and indicates a real-time vehicle speed of the vehicle. The wheel speedometer may be installed on one or more wheels of the vehicle, and is a sensor for measuring a wheel speed of the vehicle. In this way, the industrial computer may send an adjustment instruction to the front-view camera and the rear-view camera based on the real-time vehicle speed indicated by the wheel speedometer signal, to instruct the front-view camera and the rear-view camera to adjust respective collection parameters. Similarly, the laser radar may adjust a collection parameter of the laser radar based on the real-time vehicle speed indicated by the wheel speedometer signal.

The collection parameter of the front-view camera includes a frame rate and/or exposure time. The collection parameter of the rear-view camera may include a frame rate and/or exposure time. The collection parameter of the laser radar may include a frame rate and/or a horizontal scanning resolution. For example, when the vehicle speed is high, the industrial computer may instruct the front-view camera and the rear-view camera to increase the frame rate and reduce the exposure time, to ensure a quantity of target collection times and inter-frame coverage, and reduce image blur. The laser radar may increase the frame rate and the horizontal scanning resolution based on the vehicle speed, to ensure inter-frame coverage.

It can be learned that, the wheel speedometer signal is sent to the industrial computer and the laser radar, which helps adaptively adjust the collection parameters of the front-view camera, the rear-view camera, and the laser radar based on a current vehicle speed of the vehicle, to ensure that an image and a point cloud with high quality and high definition can be collected at different vehicle speeds, thereby improving drawing accuracy and meeting a requirement of a drawing platform.

Optionally, the synchronization signal board may further adjust the synchronization signal based on the received wheel speedometer signal, for example, changing a periodicity of the synchronization signal, duration or a proportion of a high level/low level, or the like. Therefore, collection moments of the front-view camera, the rear-view camera, and the laser radar may be adjusted based on the vehicle speed, so that collection rhythms of the front-view camera, the rear-view camera, and the laser radar can match the vehicle speed of the vehicle on which the device is installed. For example, when the vehicle speed is high, the synchronization signal board may shorten the periodicity of the synchronization signal based on the wheel speedometer signal, to accelerate collection frequencies of the front-view camera, the rear-view camera, and the laser radar.

Optionally, the vehicle-mounted collection device may further include a power supply (also referred to as a power supply unit/module). Alternatively, in another possible design, the synchronization signal board may further have a function of supplying power to the foregoing sensors and the industrial computer. In this case, the synchronization signal board may be referred to as a power supply and a synchronization signal board.

The GPS antenna is set outside a case of the vehicle-mounted collection device (for example, on both sides of the top of the vehicle), and is used to receive positioning data from a satellite and send the data to the power splitter. Then, the power splitter sends the positioning data from the GPS antenna to the GNSS board and the IMU at the same time. The GNSS board may position the vehicle-mounted collection device based on the received positioning data, and send an obtained position signal to the industrial computer. In this way, the industrial computer may send the photographing instruction to the front-view camera and the rear-view camera based on the synchronization signal and the position signal, so that each frame of image collected by the front-view camera and the rear-view camera may correspond to one piece of accurate position information. In addition, the industrial computer may send the position signal to the laser radar, so that the laser radar may collect the point cloud data based on the position signal and the synchronization signal from the synchronization signal board, and each scanned point cloud image may correspond to one piece of accurate position information. The IMU may determine a posture parameter of the vehicle-mounted collection device based on the positioning data, and send the posture parameter to the synchronization signal board, so that the synchronization signal board generates or adjusts the synchronization signal based on the posture parameter.

In this embodiment of this application, a heat dissipation structure is disposed on the bottom plate of the vehicle-mounted collection device, and is configured to perform ventilation and heat dissipation on the vehicle-mounted collection device. As shown in FIG. the heat dissipation structure includes an air intake vent and an air exhaust vent, where the air intake vent is disposed at a front part of the bottom plate of the device and has a front opening, and the air exhaust vent is disposed at a rear part of the bottom plate of the device and has a rear opening. As the vehicle moves forward, air flows into the vehicle-mounted collection device through the air intake vent on the bottom plate of the device, and then flows out of the vehicle-mounted collection device through the air exhaust vent to take away heat generated by components inside the vehicle-mounted collection device.

Figure 16:
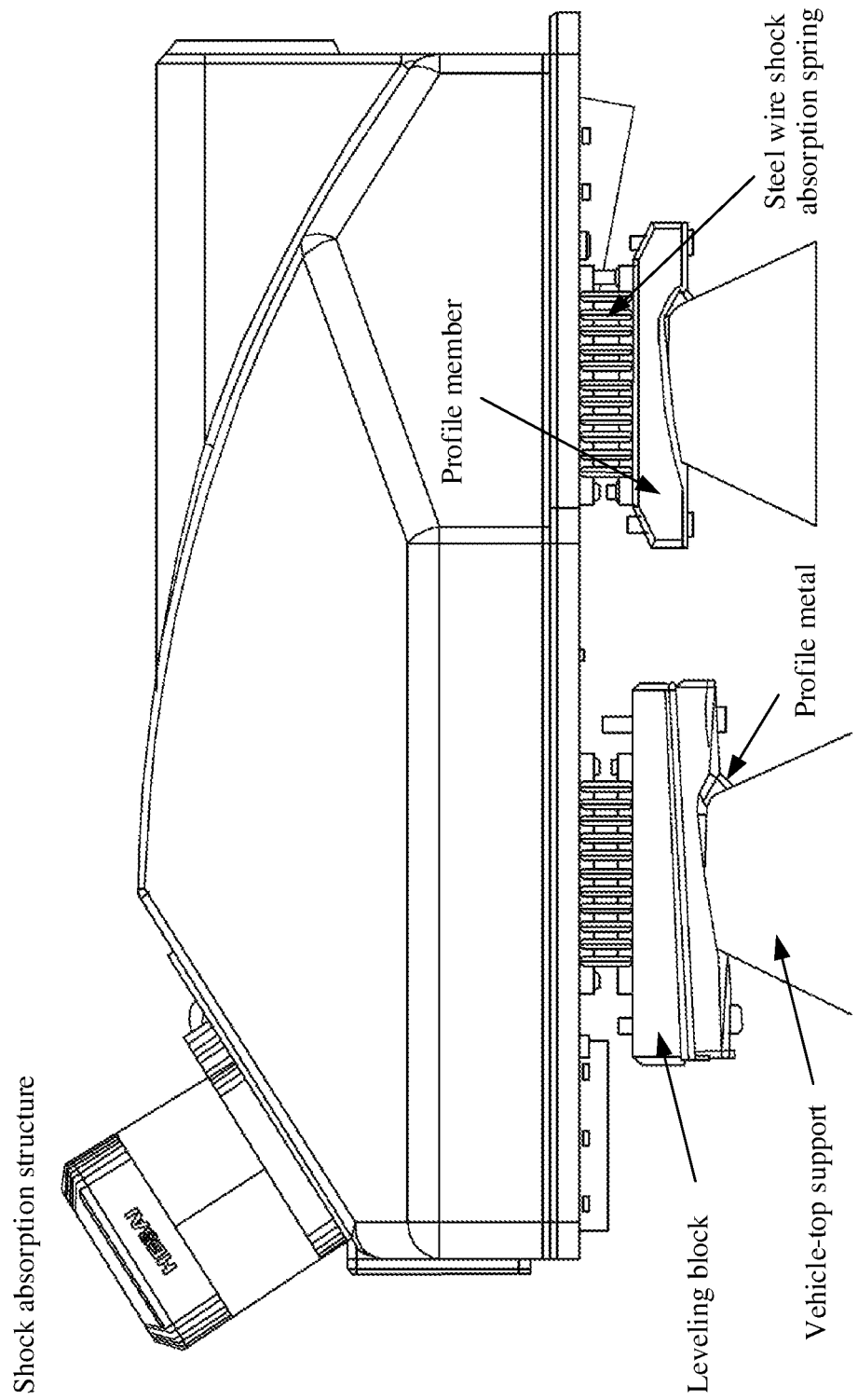
FIG. 16 is a schematic diagram of a shock absorption structure of a vehicle-mounted collection device according to an embodiment of this application.

Further, a connection structure may be disposed under the bottom plate of the device, to implement a rigid connection between the bottom plate of the device and a support of vehicle on which the device is installed, and the connection structure has a shock absorption function. As shown in FIG. 16, the connection structure includes a profile member, a steel wire shock absorption spring, and a leveling block. Optionally, the apparatus may further include a profile metal plate. The profile member is configured to fasten the device to an installation bracket on the top of the vehicle. For example, the profile member may be fastened to (or pressed on) the installation bracket on the top of the vehicle by using the disposed profile metal plate, and the leveling block is configured to level the bottom plate of the device. There may be one or more connection structures, for example, four connection structures that are symmetrically disposed under the bottom plate.

In this embodiment of this application, all hardware components are integrated into one case, so that engineering requirements such as ventilation, heat dissipation, waterproofing, and shock absorption can be ensured when the device is installed on the top of the vehicle, thereby meeting a requirement of field collection and facilitating large-scale promotion and application.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

It is clearly that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A vehicle-mounted collection device, wherein:
the device comprises a front-view camera, a rear-view camera, a laser radar, and an industrial computer;
the front-view camera is configured to collect image data in a front-view direction and send the image data to the industrial computer;
the rear-view camera is configured to collect image data in a rear-view direction and send the image data to the industrial computer;
the laser radar is configured to collect point cloud data in the rear-view direction and send the point cloud data to the industrial computer;
the front-view camera, the rear-view camera, and the laser radar are located on a midline extending in a front-to-back direction of a bottom plate of the device;
the front-view camera is disposed at a front end of the midline and faces a front of the device;
the rear-view camera and the laser radar are disposed at a rear end of the midline and face a back of the device, and the laser radar is located on the rear-view camera;
an angle of view of the front-view camera is determined based on a field of view coverage requirement in the front-view direction and a maximum vehicle speed supported by the device; and
the rear-view camera is disposed at a first downtilt, the laser radar is disposed at a second downtilt, the first downtilt is determined based on a field of view coverage requirement in the rear-view direction and the maximum vehicle speed supported by the device, and the second downtilt is determined based on the field of view coverage requirement in the rear-view direction and the maximum vehicle speed supported by the device.

2. The device according to claim 1, wherein:
the field of view coverage requirement in the front-view direction comprises a first horizontal field of view coverage requirement and a vertical field of view coverage requirement; and
the field of view coverage requirement in the rear-view direction comprises a second horizontal field of view coverage requirement and a vertical proportion requirement of a road in a photographed image.

3. The device according to claim 1, wherein:
the device further comprises a synchronization signal board;

the synchronization signal board is configured to send a synchronization signal to the industrial computer and the laser radar, wherein the synchronization signal is used to implement collection synchronization of the front-view camera, the rear-view camera, and the laser radar;

the industrial computer is configured to send a photographing instruction to the front-view camera and the rear-view camera based on the synchronization signal;

the front-view camera and the rear-view camera are configured to collect image data according to the photographing instruction; and the laser radar is configured to collect point cloud data based on the synchronization signal.

4. The device according to claim 3, wherein:

the synchronization signal board is further configured to receive a wheel speedometer signal, and send the wheel speedometer signal to the industrial computer and the laser radar, wherein the wheel speedometer signal indicates a vehicle speed of a vehicle, and the vehicle-mounted collection device is installed on the vehicle;

the industrial computer is further configured to send an adjustment instruction to the front-view camera and the rear-view camera based on the vehicle speed, wherein the adjustment instruction is used to instruct the front-view camera and the rear-view camera to adjust a collection parameter of the front-view camera and a collection parameter of the rear-view camera, respectively; and the laser radar is further configured to adjust a collection parameter of the laser radar based on the vehicle speed.

5. The device according to claim 4, wherein:

the collection parameter of the front-view camera comprises a first frame rate or first exposure time;

the collection parameter of the rear-view camera comprises a second frame rate or second exposure time; and the collection parameter of the laser radar comprises a third frame rate or a horizontal scanning resolution.

6. The device according to claim 3, wherein:

the device further comprises a global positioning system (GPS) antenna, a global navigation satellite system (GNSS) board, and a power splitter;

the GPS antenna is configured to receive positioning data from a satellite;

the power splitter is configured to send the positioning data from the GPS antenna to the GNSS board;

the GNSS board is configured to position the device based on the received positioning data, and send an obtained position signal to the industrial computer;

the industrial computer is configured to send the photographing instruction to the front-view camera and the rear-view camera based on the synchronization signal and the position signal, and send the position signal to the laser radar; and the laser radar is configured to collect the point cloud data based on the synchronization signal and the position signal.

7. The device according to claim 6, wherein:

the device further comprises an inertial measurement unit (IMU);

the power splitter is configured to send the positioning data from the GPS antenna to the IMU;

the IMU is configured to determine a posture parameter of the device based on the positioning data, and send the posture parameter to the synchronization signal board; and the synchronization signal board is configured to generate the synchronization signal based on the posture parameter.

8. The device according to claim 1, wherein a heat dissipation structure is disposed on the bottom plate of the device, and the heat dissipation structure is configured to perform ventilation and heat dissipation on the device.

9. The device according to claim 8, wherein the heat dissipation structure comprises an air intake vent and an air exhaust vent, the air intake vent is disposed at a front part of the bottom plate and has a front opening, and the air exhaust vent is disposed at a rear part of the bottom plate and has a rear opening.

10. The device according to claim 1, wherein the device is installed on a vehicle, a connection structure is disposed on the bottom plate of the device, the connection structure is configured to implement a rigid connection between the bottom plate of the device and a support of the vehicle, and the connection structure has a shock absorption function.

11. The device according to claim 10, wherein the connection structure comprises a profile member, a steel wire shock absorption spring, and a leveling block, and wherein the leveling block is configured to level the bottom plate of the device.

12. A collection system, wherein the system comprises a vehicle-mounted collection device, and wherein:

the device comprises a front-view camera, a rear-view camera, a laser radar, and an industrial computer;

the front-view camera is configured to collect image data in a front-view direction and send the image data to the industrial computer;

the rear-view camera is configured to collect image data in a rear-view direction and send the image data to the industrial computer;

the laser radar is configured to collect point cloud data in the rear-view direction and send the point cloud data to the industrial computer;

the front-view camera, the rear-view camera, and the laser radar are located on a midline extending in a front-to-back direction of a bottom plate of the device;

the front-view camera is disposed at a front end of the midline and faces a front of the device;

the rear-view camera and the laser radar are disposed at a rear end of the midline and face a back of the device, and the laser radar is located on the rear-view camera;

an angle of view of the front-view camera is determined based on a field of view coverage requirement in the front-view direction and a maximum vehicle speed supported by the device; and the rear-view camera is disposed at a first downtilt, the laser radar is disposed at a second downtilt, the first downtilt is determined based on a field of view coverage requirement in the rear-view direction and the maximum vehicle speed supported by the device, and the second downtilt is determined based on the field of view coverage requirement in the rear-view direction and the maximum vehicle speed supported by the device.

13. The system according to claim 12, wherein:

the field of view coverage requirement in the front-view direction comprises a first horizontal field of view coverage requirement and a vertical field of view coverage requirement; and the field of view coverage requirement in the rear-view direction comprises a second horizontal field of view coverage requirement and a vertical proportion requirement of a road in a photographed image.

14. The system according to claim 12, wherein:
the device further comprises a synchronization signal board;
the synchronization signal board is configured to send a synchronization signal to the industrial computer and the laser radar, wherein the synchronization signal is used to implement collection synchronization of the front-view camera, the rear-view camera, and the laser radar;
the industrial computer is configured to send a photographing instruction to the front-view camera and the rear-view camera based on the synchronization signal;
the front-view camera and the rear-view camera are configured to collect image data according to the photographing instruction; and
the laser radar is configured to collect point cloud data based on the synchronization signal.

15. The system according to claim 14, wherein:
the synchronization signal board is further configured to receive a wheel speedometer signal, and send the wheel speedometer signal to the industrial computer and the laser radar, wherein the wheel speedometer signal indicates a vehicle speed of a vehicle, and the vehicle-mounted collection device is installed on the vehicle;
the industrial computer is further configured to send an adjustment instruction to the front-view camera and the rear-view camera based on the vehicle speed, wherein the adjustment instruction is used to instruct the front-view camera and the rear-view camera to adjust a collection parameter of the front-view camera and a collection parameter of the rear-view camera, respectively; and
the laser radar is further configured to adjust a collection parameter of the laser radar based on the vehicle speed.

16. The system according to claim 15, wherein:
the collection parameter of the front-view camera comprises a first frame rate or first exposure time;
the collection parameter of the rear-view camera comprises a second frame rate or second exposure time; and
the collection parameter of the laser radar comprises a third frame rate or a horizontal scanning resolution.

17. The system according to claim 14, wherein:
the device further comprises a global positioning system (GPS) antenna, a global navigation satellite system (GNSS) board, and a power splitter;
the GPS antenna is configured to receive positioning data from a satellite;
the power splitter is configured to send the positioning data from the GPS antenna to the GNSS board;
the GNSS board is configured to position the device based on the received positioning data, and send an obtained position signal to the industrial computer;
the industrial computer is configured to send the photographing instruction to the front-view camera and the rear-view camera based on the synchronization signal and the position signal, and send the position signal to the laser radar; and
the laser radar is configured to collect the point cloud data based on the synchronization signal and the position signal.

18. The system according to claim 17, wherein:
the device further comprises an inertial measurement unit (IMU);
the power splitter is configured to send the positioning data from the GPS antenna to the IMU;
the IMU is configured to determine a posture parameter of the device based on the positioning data, and send the posture parameter to the synchronization signal board; and
the synchronization signal board is configured to generate the synchronization signal based on the posture parameter.

19. The system according to claim 12, wherein a heat dissipation structure is disposed on the bottom plate of the device, and the heat dissipation structure is configured to perform ventilation and heat dissipation on the device.

20. The system according to claim 19, wherein the heat dissipation structure comprises an air intake vent and an air exhaust vent, the air intake vent is disposed at a front part of the bottom plate and has a front opening, and the air exhaust vent is disposed at a rear part of the bottom plate and has a rear opening.

* * * * *